United States Patent
Lee et al.

(10) Patent No.: US 11,859,580 B2
(45) Date of Patent: Jan. 2, 2024

(54) DEVICE FOR SUPPLYING INJECTION WATER

(71) Applicants: HYUNDAI MOTOR COMPANY, Seoul (KR); KIA CORPORATION, Seoul (KR); HYUNDAM INDUSTRIAL CO., LTD., Asan-si (KR)

(72) Inventors: Sung Won Lee, Hwaseong-si (KR); Seung Hoon Choi, Seoul (KR); Seong Cheol Cho, Seoul (KR); Yong Taek Hwang, Cheonan-si (KR); Chan Yo Jeon, Cheonan-si (KR)

(73) Assignees: HYUNDAI MOTOR COMPANY, Seoul (KR); KIA CORPORATION, Seoul (KR); HYUNDAM INDUSTRIAL CO., LTD., Asan-si (KR)

( * ) Notice: Subject to any disclaimer, the term of this patent is extended or adjusted under 35 U.S.C. 154(b) by 0 days.

(21) Appl. No.: 17/852,012

(22) Filed: Jun. 28, 2022

(65) Prior Publication Data
US 2023/0008820 A1   Jan. 12, 2023

(30) Foreign Application Priority Data
Jul. 6, 2021 (KR) .......................... 10-2021-0088528

(51) Int. Cl.
*F02M 25/022* (2006.01)
*F02M 25/028* (2006.01)
(Continued)

(52) U.S. Cl.
CPC ......... *F02M 25/0224* (2013.01); *B01D 29/11* (2013.01); *B01D 29/605* (2013.01); *B01D 29/606* (2013.01); *B01D 29/608* (2013.01); *B01D 35/26* (2013.01); *F02M 25/028* (2013.01); *F02M 25/0222* (2013.01); *F02M 25/0227* (2013.01); *F24H 1/009* (2013.01);
(Continued)

(58) Field of Classification Search
CPC .... H05B 1/0244; F24H 1/009; F02M 25/028; F02M 25/0222; F02M 25/0224
See application file for complete search history.

(56) References Cited

U.S. PATENT DOCUMENTS 10,746,134 B2   8/2020  Park et al.
2007/0277775 A1 * 12/2007 Orlosky ................. F02M 25/14
                                                         123/25 J
(Continued)

FOREIGN PATENT DOCUMENTS

KR        20190045706 A      5/2019

*Primary Examiner* — Kevin A Lathers
(74) *Attorney, Agent, or Firm* — LEMPIA SUMMERFIELD KATZ LLC

(57) ABSTRACT

A device for supplying injection water capable of stably supplying the water to a water injection system of a vehicle. The device for supplying injection water includes a storage unit configured to store water, a management unit mounted on the storage unit and configured to detect a state of the water stored in the storage unit and manage the water, a transport unit connected to the storage unit through the management unit and configured to outwardly move the water, and an integrated controller configured to control operations of the management unit and the storage unit.

20 Claims, 12 Drawing Sheets

(51) Int. Cl.
*F24H 1/00* (2022.01)
*B01D 29/11* (2006.01)
*B01D 29/60* (2006.01)
*B01D 35/26* (2006.01)
*H05B 1/02* (2006.01)

(52) U.S. Cl.
CPC ....... *H05B 1/0244* (2013.01); *F24H 2250/02* (2013.01)

(56) References Cited

U.S. PATENT DOCUMENTS

| | | | |
|---|---|---|---|
| 2018/0023522 A1* | 1/2018 | Styles | F02M 25/0222 |
| | | | 123/559.1 |
| 2019/0120176 A1 | 4/2019 | Park et al. | |
| 2022/0381685 A1* | 12/2022 | Morimoto | G01N 21/3577 |

* cited by examiner

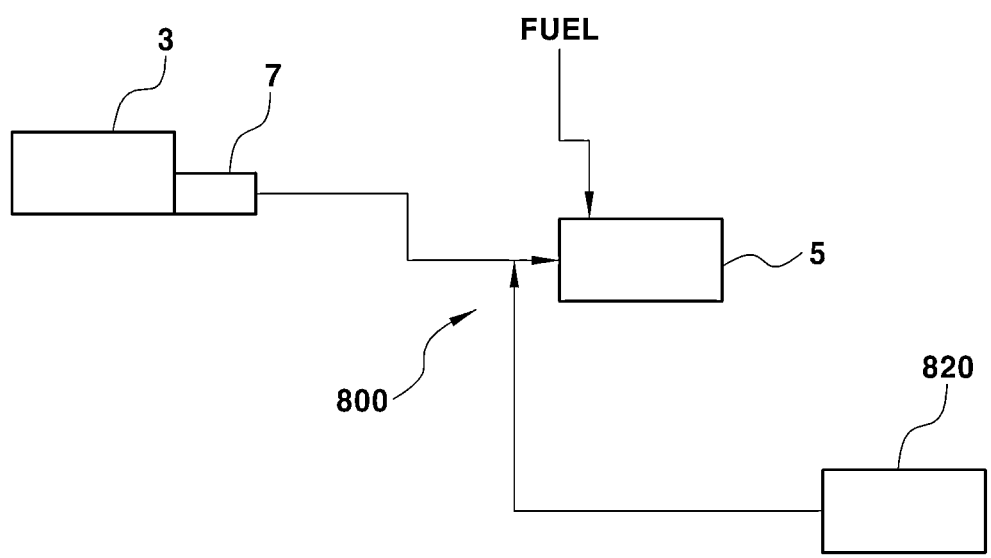
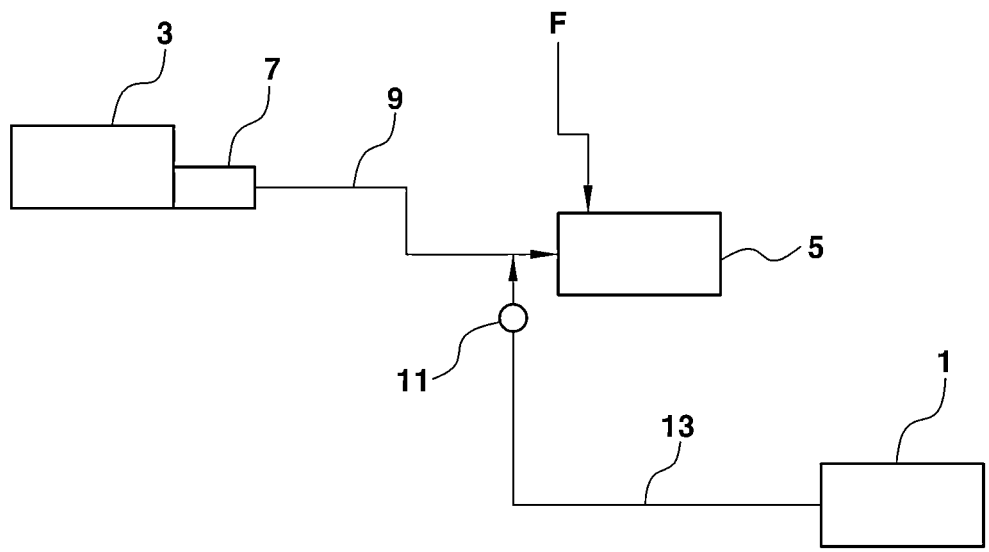

DEVICE FOR SUPPLYING INJECTION WATER

CROSS-REFERENCE TO RELATED APPLICATION

This application claims under 35 U.S.C. § 119(a) the benefit of priority to Korean Patent Application No. 10-2021-0088528 filed on Jul. 6, 2021, the entire contents of which are incorporated herein by reference.

BACKGROUND

(a) Technical Field

The present disclosure relates to a device for supplying injection water, and more particularly, to a device for supplying injection water capable of stably supplying water to a water injection system for a vehicle.

(b) Background Art

A variety of technologies have been and are continuously being developed to lower combustion heat of an engine to improve fuel efficiency during combustion of the engine for a vehicle, as well as to suppress emissions, such as nitrogen oxide, hydrocarbon, and so on. A water injection system may be included as one of these technologies.

Such a water injection system is illustrated in FIG. 1. Referring to FIG. 1, compressed air is injected into a combustion chamber of an engine 5 through a supercharger 3 in a gasoline turbo engine. In view of improving output and efficiency, air having a temperature as low as possible is supplied to the engine. Thus heated supercharged air passing the supercharger 3 is configured to be cooled through an intercooler 7. However, despite the cooling of the intercooler 7, the compressed air is not sufficiently cooled when the engine is operating in a high load region.

Due to a high temperature of the compressed air, a reduction in output, a frequency of knocking generation, and a fuel consumption of the engine are increased. A solution for these problems is a water injection system 800. The water injection system 800 injects high-pressure water from a water supplying part 820 toward an intake port of the engine 5, thereby lowering the temperature of the compressed air. Thereby, the water injection system can contribute to an improvement in output, prevention of knocking, an improvement in fuel efficiency, and a reduction in emissions, such as carbon dioxide, in the engine.

SUMMARY OF THE DISCLOSURE

There is a need for a supplying device capable of stably supplying water from a water supplying section up to a water injection port adjacent to an engine intake port such that the water injection system can be smoothly operated.

The present disclosure has been made in an effort to solve the above-described problems.

An objective of the present disclosure is to provide a device for supplying injection water that enables high-pressure water to be supplied to a water injection port provided adjacent to an engine intake port while maintaining a fixed pressure in a water injection system.

Objectives of the present disclosure are not limited to the above-described objectives. Other objectives of the present disclosure, which are not mentioned herein, should be clearly understood from the following description by a person having ordinary skill in the art to which the present disclosure pertains (hereinafter referred to as an "ordinary engineer").

Features of the present disclosure for achieving the above-described objectives and performing characteristic functions of the present disclosure that are described below are as follows.

According to an embodiment of the present disclosure, a device for supplying injection water includes: a storage unit configured to store water; a management unit mounted on the storage unit and configured to detect a state of the water stored in the storage unit and manage the water; a transport unit connected to the storage unit through the management unit and configured to outwardly move the water; and an integrated controller configured to control operations of the management unit and the storage unit.

The device for supplying injection water according to the present disclosure is configured to supply high-pressure water to a water injection port provided adjacent to an engine intake port while maintaining a fixed pressure in a water injection system.

Effects of the present disclosure are not limited to the above-described effects. Other effects that are not described herein should be clearly recognized by those having ordinary skill In the art from the following descriptions.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus do not limit the present disclosure, and wherein:

FIG. 1 illustrates a configuration of a water injection system;

FIG. 2 illustrates a general operation example of a device 1 for supplying injection water according to the present disclosure;

Figure 3:
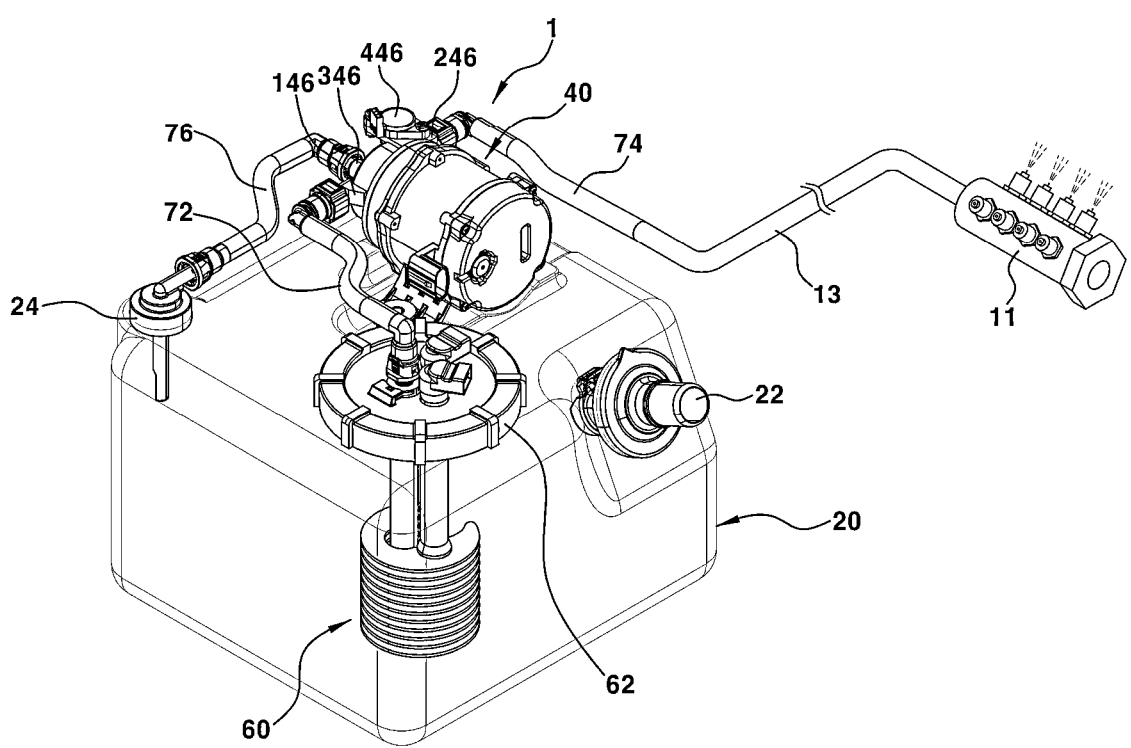
FIG. 3 is a perspective view of a device for supplying injection water according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structures or functions described in the embodiments of the present disclosure are merely for illustrative purposes. Embodiments according to the concept of the present disclosure may be implemented in various forms. It should be understood that the structures and functions of the present disclosure should not be construed as being limited to the embodiments described in the present specification, but include all of modifications, equivalents, or substitutes included in the spirit and scope of the present disclosure.

It should be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. When a component, device, element, or the like of the present disclosure is described as having a purpose or performing an operation, function, or the like, the component, device, or element, should be considered herein as being "configured to" meet that purpose or to perform that operation or function.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It should be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure is described in detail with reference to the accompanying drawings.

A general operation example of a device 1 for supplying injection water according to the present disclosure is illustrated in FIG. 2.

As described above, compressed air supercharged through a supercharger 3 is cooled by an intercooler 7. The compressed air passing through the intercooler 7 proceeds to a combustion chamber of an engine 5 along an air supply line 9. Apart from fuel F supplied to the combustion chamber of the engine 5, a water injector 11 for injecting water toward an intake port of the engine 5 is provided adjacent to the intake port, and cools compressed air flowing toward the engine 5. The water supplied to the water injector 11 is supplied from the device 1 for supplying injection water through an injection water supply line 13.

As illustrated in FIG. 3, the device 1 for supplying injection water according to an embodiment of the present disclosure includes a storage unit 20, a transport unit 40, and a management unit 60. The storage unit 20 stores water to be supplied toward the intake port of the engine 5, and the transport unit 40 functions to send the water stored in the storage unit 20 up to the intake port of the engine 5. The management unit 60 serves to manage the injection water stored in the storage unit 20.

The storage unit 20 is configured to store water. The storage unit 20 includes a primary input port 22. The storage unit 20 may be filled with the injection water through the primary input port 22. In addition, a secondary input port 24 for receiving the injection water from the outside is provided to the storage unit 20. The secondary input port 24 is be described below.

The transport unit 40 may be connected to the storage unit 20 and be disposed at an upper portion of the storage unit 20. The transport unit 40 is configured to send out the water in the storage unit 20 toward the water injector 11 such that the water is injected from the vicinity of the intake port of the engine 5. To this end, according to an embodiment of the present disclosure, the transport unit 40 includes a motor section 42 and a pump section 44.

Figure 4:
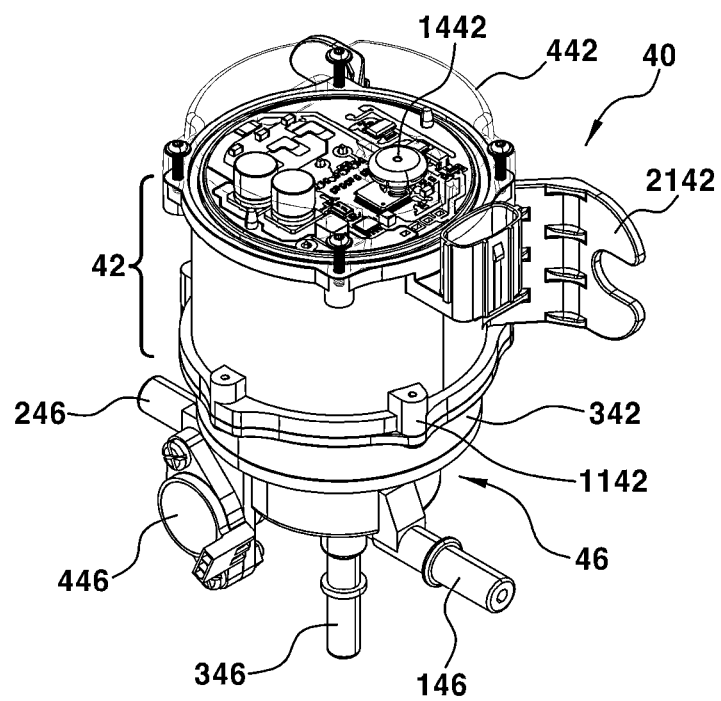
FIG. 4 is a perspective view of a transport unit according to an embodiment of the present disclosure.
Figure 5:
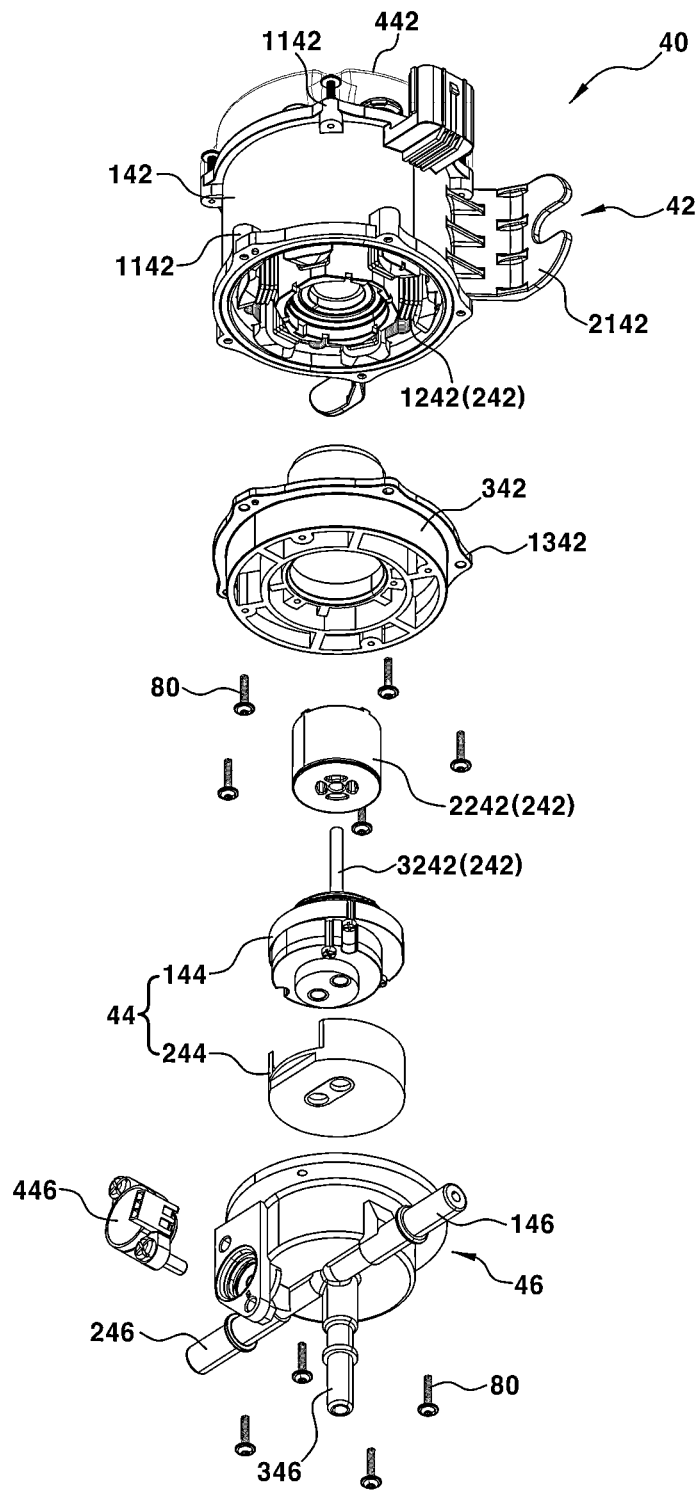
FIG. 5 is an exploded perspective view of FIG. 4.

As illustrated in FIGS. 4 and 5, the motor section 42 is supplied with power from the outside and provides a rotational force to a pump 144. According to an embodiment of the present disclosure, the motor section 42 includes a motor housing 142, a motor 242, and a sealing cap 342.

The motor 242 is supplied with electric energy from a power supply and operates a stator 1242 and a rotor 2242. The stator 1242 is installed inside the motor housing 142, and the rotor 2242 is rotatably disposed inside the stator 1242. A shaft 3242 coupled to the rotor 2242 transfers power of the motor 242 to the pump 144. As a non-limiting example, the motor 242 may be a brushless direct current (BLDC) motor.

The transport unit 40 may be provided with a motor controller 50. The motor controller 50 is configured to control an operation of the motor 242. The motor controller 50 is configured to control the motor 242. The motor controller 50 receives pressure information from an integrated controller 100 that controls the device for supplying injection water in an integrated way and implements feedback controls of a rotational speed of the pump 144 under control of the motor 242. According to an embodiment of the present disclosure, the motor controller 50 may be a printed circuit board. According to the present disclosure, the motor controller 50 for the control of the pump 144 is formed integrally with the device 1 for supplying injection water or the transport unit 40, and thereby costs can be reduced.

According to some embodiments of the present disclosure, the motor controller 50 is integrated with the integrated controller 100. According to another embodiment of the present disclosure, the motor controller 50 and the integrated controller 100 may be formed separately. According to the present disclosure, the motor controller is integrally formed with the device 1 for supplying injection water, and thereby costs can be reduced.

The sealing cap 342 is mounted on the motor housing 142 in a water tight manner to protect the motor 242 from the pump 144. According to an embodiment of the present disclosure, the sealing cap 342 has a plurality of through-holes 1342 separated at certain intervals in a circumference of the sealing cap 342. Couplers 1142 capable of overlapping the plurality of through-holes 1342 are provided to the motor housing 142 or in a circumference of the motor housing 142. Fastening members 80, such as bolts, may be mounted through the through-holes 1342 and the couplers 1142 to couple the motor housing 142 and the sealing cap 342. In this way, the device 1 for supplying injection water according to the present disclosure has a waterproof structure of the motor section 42, thereby improving corrosion resistance. The motor housing 142 may include a mounting bracket 2142 for mounting the transport unit 40 to the storage unit 20.

Figure 6:
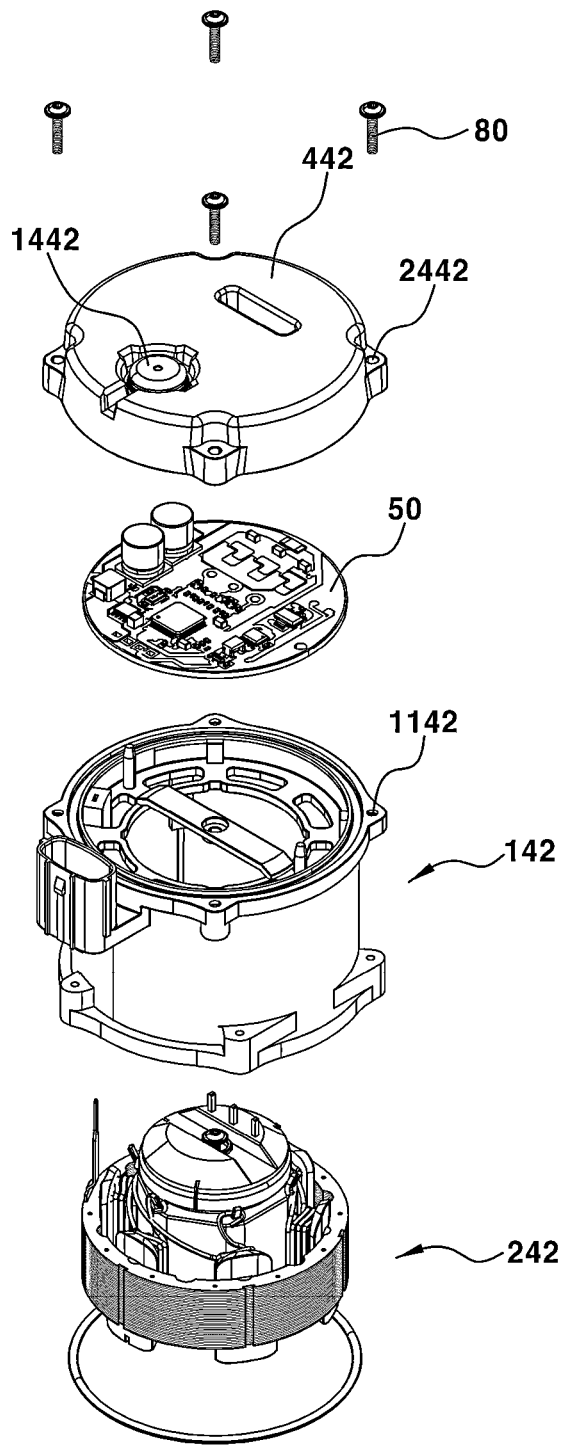
FIG. 6 is a partly exploded perspective view of a motor section according to an embodiment of the present disclosure.

Referring to FIG. 6, a motor-side cap 442 is coupled on one side of the motor section 42. The motor-side cap 442 may emit heat of the motor controller 50 disposed therein. For example, the motor-side cap 442 may be formed of a material having excellent heat radiation performance, and as a non-limiting example, aluminum may be utilized. Further, a vent 1442, which provides fluid communication between the inside and outside of the motor-side cap 442, is provided to the motor-side cap 442. The vent 1442 functions to prevent dew condensation in the motor controller 50 and maintain a pressure of the motor controller 50. The pump section 44 is located on the other side of the motor section 42 which is a side opposite to the one side of the motor section 42.

The pump section 44 is coupled to the motor section 42. The pump section 44 includes the pump 144 and a pump housing 244. The pump 144 is operably coupled to the motor 242 or a shaft 3242, forms a pressure of the injection water, draws the injection water from the storage unit 20, and causes the drawn injection water to flow in a set direction. The pump housing 244 houses the pump 144. The pump housing 244 is housed in a pump-side cap 46 coupled to the pump section 44. According to an embodiment of the present disclosure, the pump 144 may be an inline pump. The present disclosure can prevent problems, such as damage when water is frozen in the winter season due to an inline pump system.

According to an embodiment of the present disclosure, the pump-side cap 46 includes a suction port 146, a discharge port 246, and a bypass port 346. The suction port 146 is configured such that the injection water drawn from the storage unit 20 flows thereinto. The discharge port 246 is configured to supply the injection water from the suction port 146 toward the engine 5 along the injection water supply line 13. The bypass port 346 functions to return the injection water inside the injection water supply line 13 to the storage unit 20.

The bypass port 346 may be connected to, especially, the secondary input port 24 of the storage unit 20 and return the injection water remaining in the injection water supply line 13 to the storage unit 20 through the secondary input port 24. According to an embodiment of the present disclosure, the motor controller 50 is configured to enable reverse rotation of the motor 242. Therefore, a negative pressure may be formed by the reverse rotation of the motor 242, and the water remaining in the injection water supply line 13 may be directed back to the storage unit 20. It is possible to prevent damage to the pump and the line caused by volume expansion when water is frozen at a low temperature, for instance, in the winter season. Therefore, according to the present disclosure, stability and reliability of wintertime supply can be ensured.

Further, the present disclosure enables smooth water circulation while enabling simplification by integrating a multifunction discharge structure into the pump-side cap 46 provided at a lower end of the pump 144. The multifunction discharge structure includes the suction port 147 for directly connecting the storage unit 20 with the suction port of the pump 44, the discharge port 246 for sending water therefrom to the manifold or the water injector 11, and the bypass port 346.

A pressure sensor 446 is mounted on the pump-side cap 46. The pressure sensor 446 is configured to detect a pressure inside the pump housing 244 or the discharge port 246. The pressure measured by the pressure sensor 446 may be transferred to the integrated controller 100 that manages the device for supplying injection water. The integrated controller 100 may transmit pressure information to the motor controller 50 in real time and the motor controller 50 may have feedback control over the rotational speed of the pump 144 on the basis of the real-time pressure information.

Figure 7A:
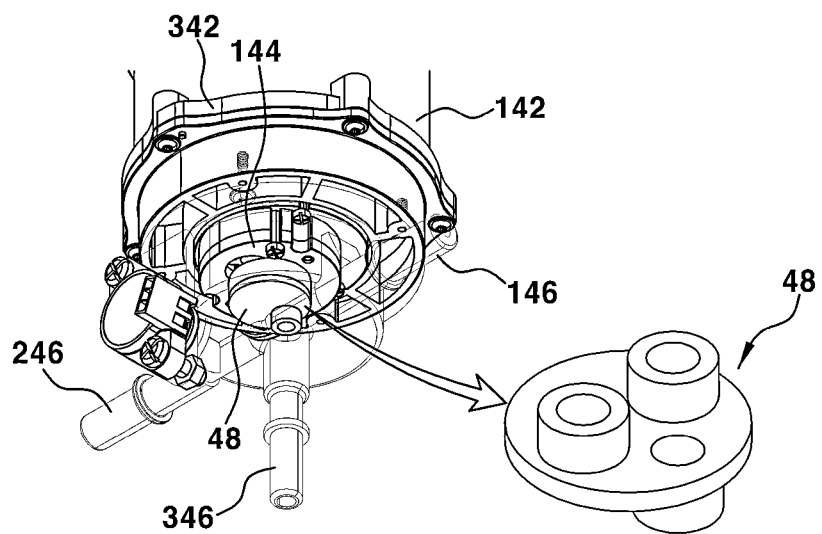
FIG. 7A is a partial perspective view of a lower portion of a transport unit according to an embodiment of the present disclosure.
Figure 7B:
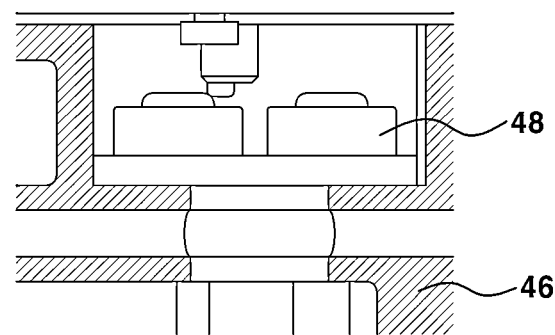
FIG. 7B is a general sectional view of a lower pump-side cap of a transport unit according to an embodiment of the present disclosure.

As illustrated in FIGS. 7A and 7B, a packing member 48 may be disposed adjacent to an outlet of the pump 144. The packing member 48 has a sealing function that prevents water flowing through the pump 144 from leaking around the discharge port 246, as well as absorbs vibrations caused by operations of the motor 242 and the pump 144.

In other words, according to an embodiment of the present disclosure, referring to FIG. 6 again, the motor controller 50 is coupled to the motor housing 142. The motor controller 50 placed on the motor section 42 at the opposite side of the pump section 44 is covered and protected by the motor-side cap 442. The vent 1442 provided in the motor-side cap 442 may prevent the dew condensation in the motor controller 50 and maintain a pressure inside the motor-side cap 442.

The management unit 60 is configured to manage the injection water in the storage unit 20. More specifically, the management unit 60 is configured to remove impurities for the injection water in the storage unit 20, to control a temperature of the injection water, and to detect a level of the injection water in the storage unit 20.

Figure 8:
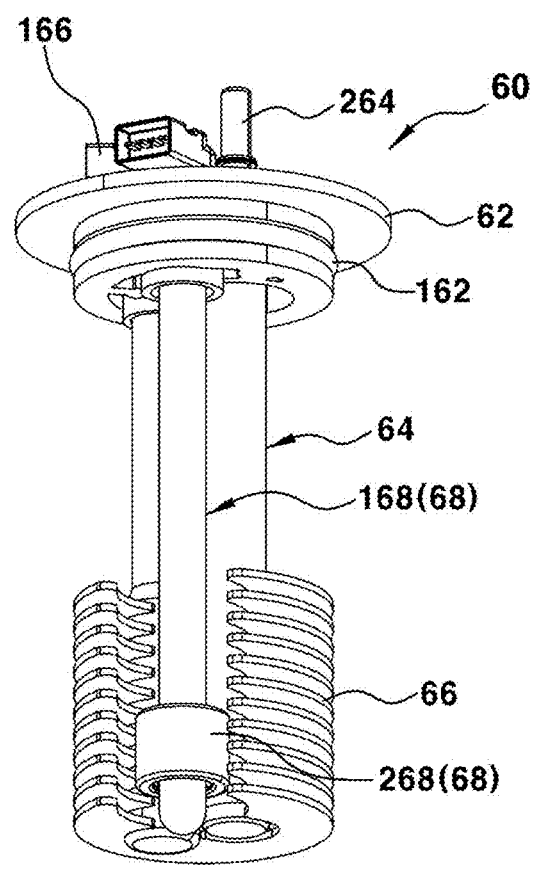
FIG. 8 is a perspective view of a management unit according to an embodiment of the present disclosure.

As illustrated in FIG. 8, according to an embodiment of the present disclosure, the management unit 60 includes a lid 62, a filter section 64, a heater section 66, and a sensor section 68.

The lid 62 is detachably coupled to the storage unit 20. The lid 62 is mounted in a water tight manner on the storage unit 20, including a watertight member 162. As a non-limiting example, the watertight member 162 may be an O-ring.

Figure 9A:
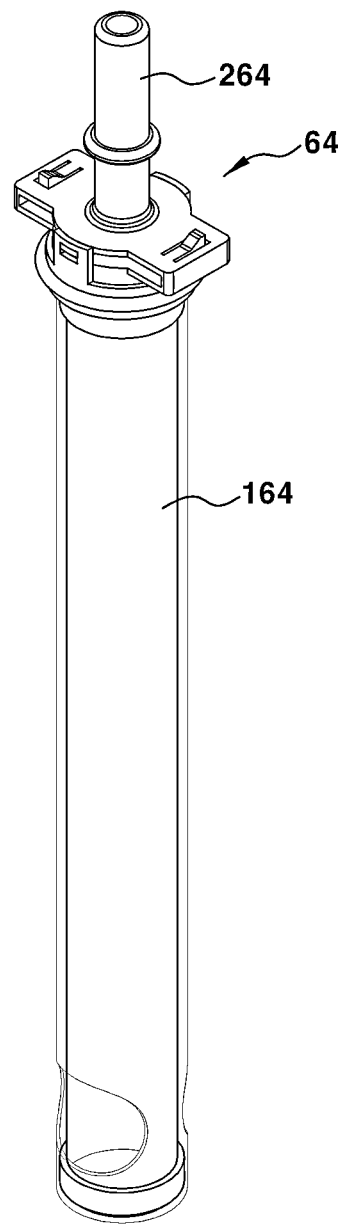
FIG. 9A is a perspective view of a filter section of a management unit.

Referring to FIG. 9A, the filter section 64 is coupled to the lid 62. The filter section 64 includes a filter 164 and a filter discharge port 264. The filter 164 is located inside the storage unit 20 to filter the injection water from the storage unit 20. The filter discharge port 264 is configured to allow the injection water flowing through the filter 164 to flow to the suction port 146 through a suction line 72. According to an embodiment of the present disclosure, the filter discharge port 264 is coupled to the lid 62, and more specifically is coupled to pass through the lid 62. As a non-limiting example, the filter 164 may be a string wound filter.

Figure 9B:
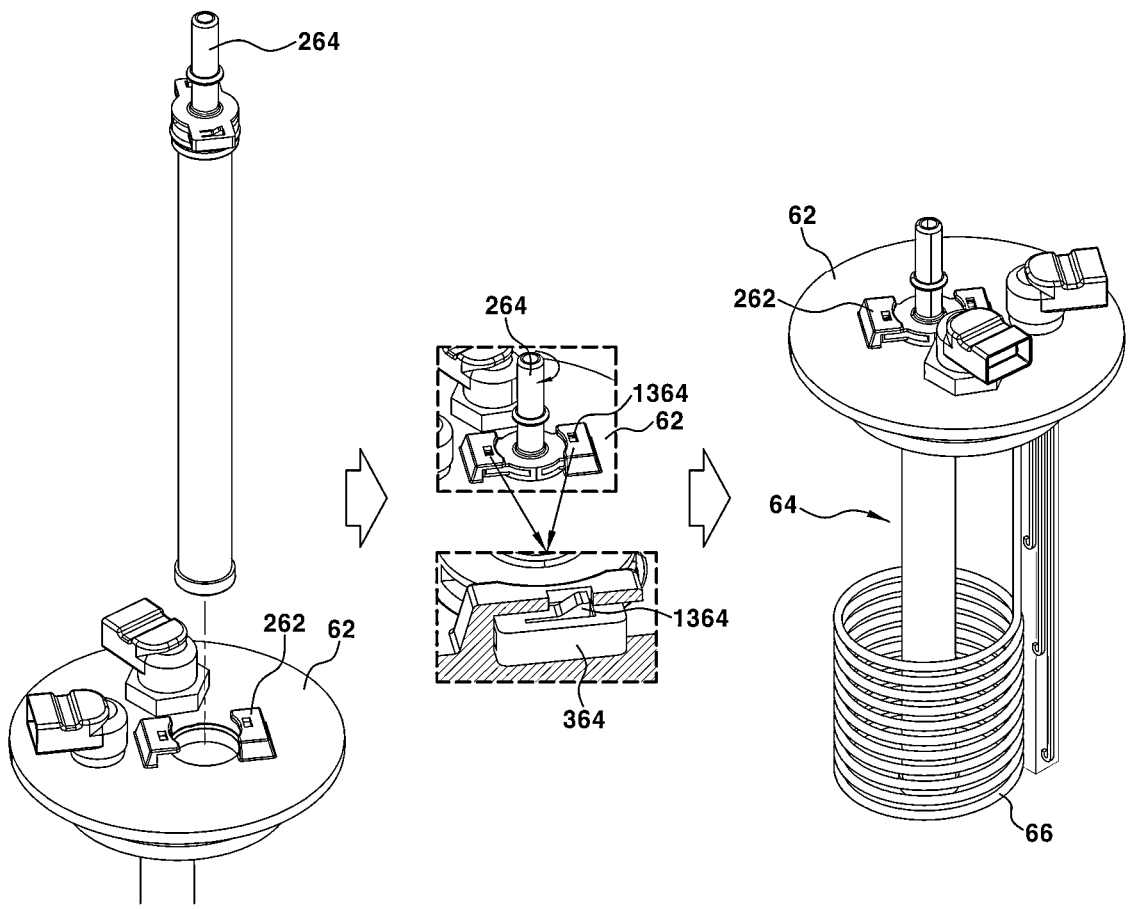
FIG. 9B illustrates a mounting state in which a filter section is mounted on a management unit.

A process in which the filter section 64 is mounted on the lid 62 is illustrated in FIG. 9B. The filter section 64 may be rotatably fitted downward from above the lid 62. According to an embodiment of the present disclosure, the lid 62 includes fixing members 262, and the filter section 64 includes a fastening flange 364 that can be coupled with the fixing members 262. The fastening flange 364 may be detachably inserted into the fixing members 262, including fastening protrusions 1364 that are snap-fit structures. For example, the fixing members 262 may be provided only to parts of a circumference of an insertion hole of the filter section 64. The fixing members 262 and the fastening protrusions 1364 may be coupled by a snap-fit method while being rotated after being inserted into the insertion hole of the filter section 64.

According to the present disclosure, the filter section 64 can be easily mounted/demounted to/from the lid 62 so that it may be easily assembled and maintenance is convenient when the filter is replaced.

Referring to FIG. 8 again, the heater section 66 is also coupled to the lid 62. The heater section 66 functions to adjust the temperature of the injection water in the storage unit 20. For example, when the injection water is frozen, the heater section 66 functions to heat and remove ice formation in the injection water of the storage unit 20. As a non-limiting example, the heater section 66 may be a coil heater. The heater section 66 may be supplied with power through a connector 166 that protrudes outward from the storage unit 20. The heater section 66 is disposed adjacent to the filter section 164 to surround the filter section 164, and heats radially the inside and outside of the filter 164 and around the filter 164. Thus, stable water supply is possible, for instance, in the winter season when a temperature is low.

Figure 10:
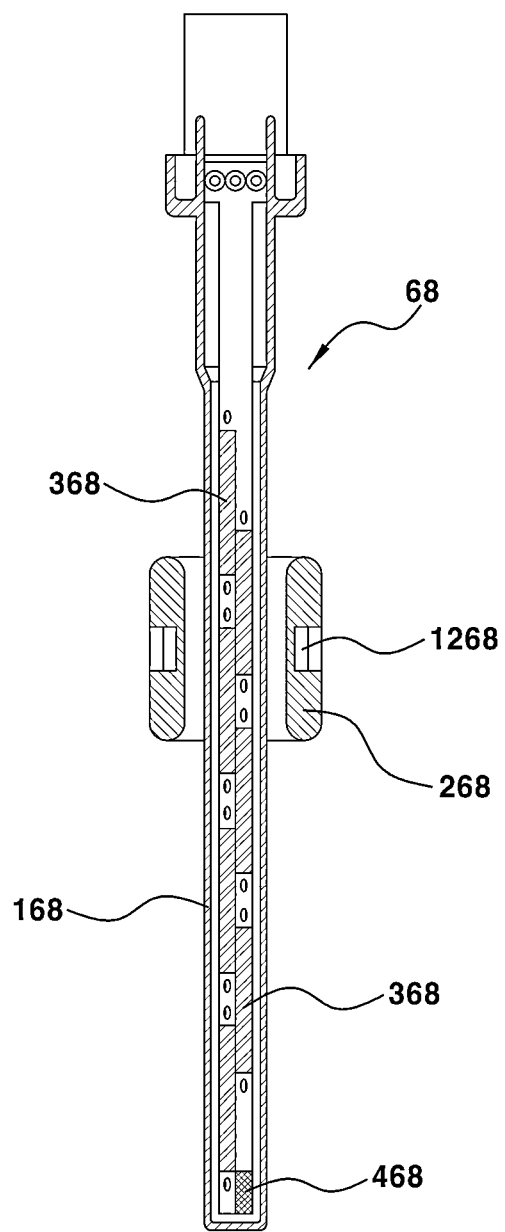
FIG. 10 is a sectional view of a sensor section according to an embodiment of the present disclosure.

The sensor section 68 is configured to provide fundamental information by which the management unit 60 manages the injection water stored in the storage unit 20. According to an embodiment of the present disclosure, the sensor section 68 includes a sensor for measuring the temperature of the injection water and a sensor for measuring the level of the injection water remaining in the storage unit 20. To this end, according to an embodiment of the present disclosure, as illustrated in FIG. 10, the sensor section 68 includes a sensor body 168, a float 268, a reed switch 368, and a thermistor 468.

The sensor body 168 is disposed to be immersed in the storage unit 20 and is fixed to the lid 62, along with the filter section 64 and the heater section 66. The sensor body 168 serves to protect internal sensing parts. According to the present disclosure, the reed switch 368 and the thermistor 468 may be over molded onto the sensor body 168 to minimize water contact. Thus, it is possible to prevent corrosion, reduce cost, and improve reliability.

The level of the injection water remaining in the storage unit 20 may be measured by a magnetic float level sensor. To this end, according to an embodiment of the present disclosure, the float 268 and the reed switch 368 are configured to measure the level of the injection water in the storage unit 20. The float 268 is configured to be movable along the sensor body 168 to float on the level of the injection water and includes a magnet 1268 therein. When the magnet 1268 vertically moves along the sensor body 168, the reed switch 368 inside the sensor body 168 is turned on or off to measure a level of water. In other words, the magnetic float level sensor well-known as a water level measurement sensor may be applied.

Meanwhile, the sensor body 168 includes the thermistor 468. The thermistor 468 may measure the temperature of the injection water of the storage unit 20.

According to the present disclosure, the management unit 60 is configured as a compact integrated module in which the filter section 64, the heater section 66, and the sensor section 68 are mounted on the single lid 62. Especially, the lid 62 of the management unit 60 is disposed at an upper end of the storage unit 20. Thereby, damage to the management unit 60 can be prevented by reducing a direct influence range of stress caused by volumetric expansion when water is frozen in the winter season. A structure of this management unit 60 can simplify an assembly process and make maintenance more convenient and easier.

Figure 11:
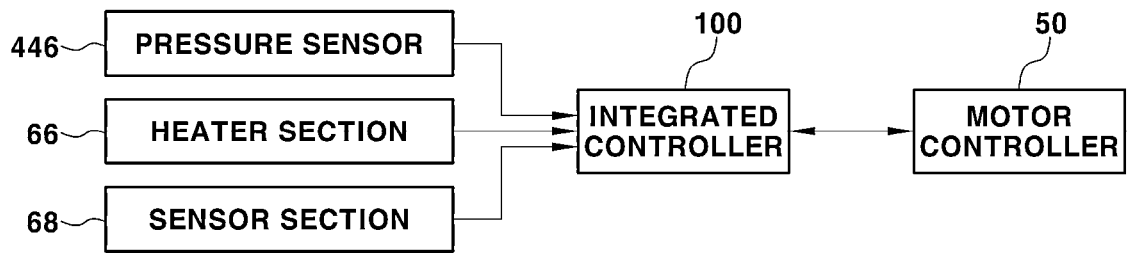
FIG. 11 illustrates a control system for a device for supplying injection water according to an embodiment of the present disclosure.

As illustrated in FIG. 11, the integrated controller 100 is configured to control the device 1 for supplying injection water. A pressure in the pump housing 244 or the discharge port 246 detected by the pressure sensor 446 is transmitted to the integrated controller 100. The integrated controller 100 transmits the collected pressure information to the motor controller 50 in real time. The motor controller 50 may control rotation of the motor 242 on the basis of the received pressure.

Further, the integrated controller 100 receives information about the level of water of the storage unit 20 and information about a temperature of the injection water stored in the storage unit 20 from the reed switch 368 and the thermistor 468 of the sensor section 68. When water needs to be refilled for the storage unit 20 based on the information from the reed switch 368, the integrated controller 100 may be configured to inform the water refill is needed. For example, the integrated controller 100 may be configured to display a need for the water refill on an instrument panel of a vehicle.

The integrated controller 100 may be configured to receive temperature information about water in the storage unit 20 from the thermistor 468 and to operate the heater section 66 as needed. When the temperature detected by the thermistor 468 approaches a freezing temperature, the integrated controller 100 may instruct the heater section 66 to operate.

Further, the integrated controller 100 may drive the heater section 66 at preset intervals of time. For example, the integrated controller 100 is configured to forcibly operate the heater section 66 in a cycle preset according to each temperature. Multiplication of, for instance, germs can be prevented by periodically heating the water in the storage unit 20.

Figure 12:
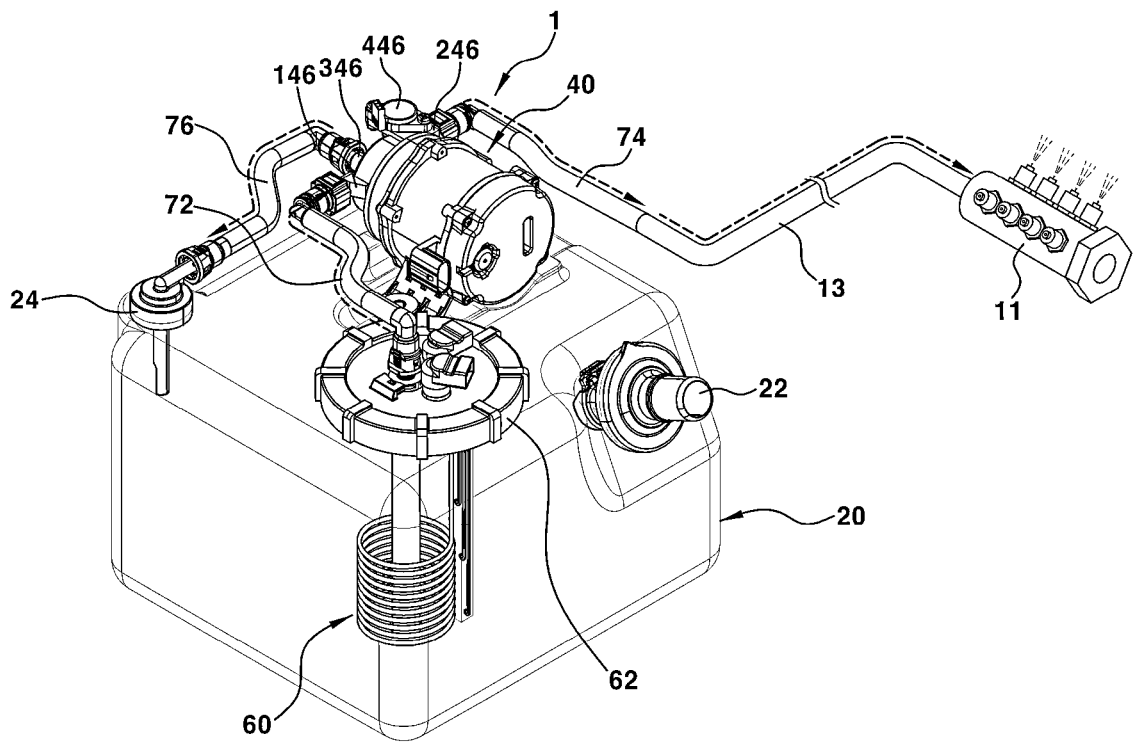
FIG. 12 illustrates a state in which water is supplied to a water injector in a device for supplying injection water according to an embodiment of the present disclosure.
Figure 13:
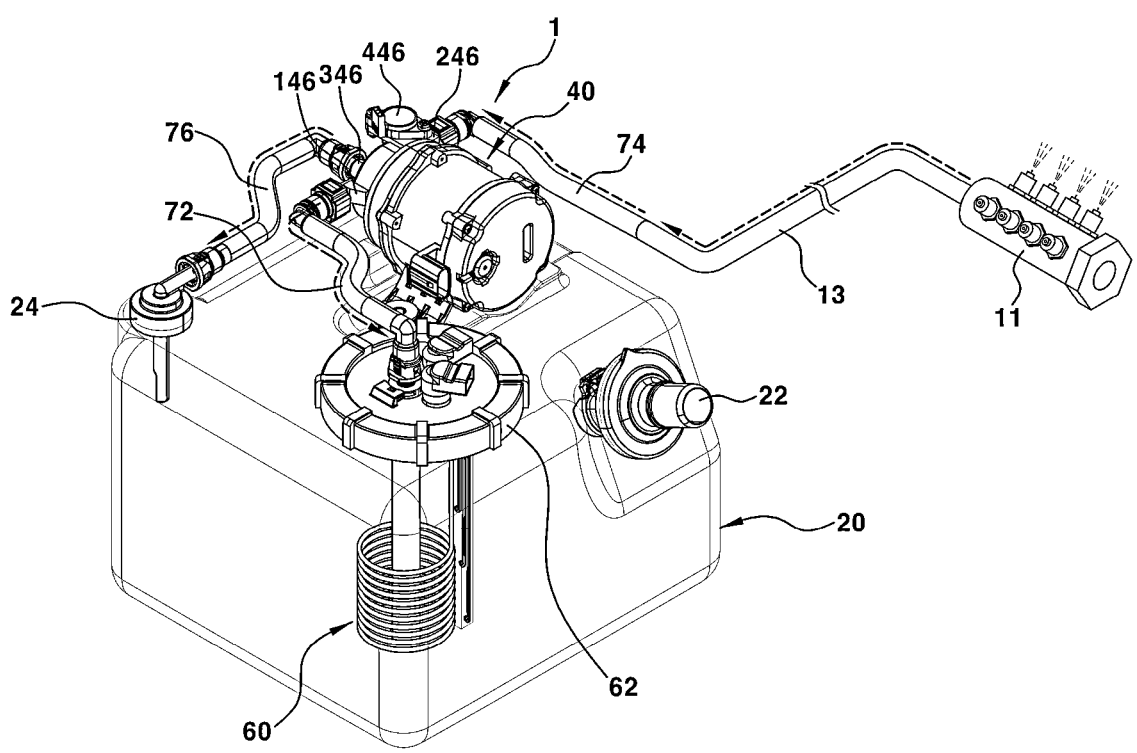
FIG. 13 illustrates a state in which water is collected to a storage unit from an injection water supply line in a device for supplying injection water according to an embodiment of the present disclosure.

A flow of the injection water during forward and backward operations of the motor 242 in the device 1 for supplying injection water is illustrated in FIGS. 12 and 13.

As illustrated in FIG. 12, when the water in the storage unit 20 is supplied toward the water injector 11, the motor 242 is rotated in a forward direction. When the motor 242 is rotated in a forward direction, the water in the storage unit 20 is filtered through the filter section 64, and then is discharged from the storage unit 20 through the discharge port 264. The water flowing through the discharge port 264 flows into the suction port 146 of the pump-side cap 46 along the suction line 72 and flows to the injection water supply line 13 along the discharge line 74 through the discharge port 246. The flowing water is injected adjacent to an intake port of the engine 5 by the water injector 11.

As illustrated in FIG. 13, to collect back the water remaining in the injection water supply line 13, the motor 242 is rotated in a backward direction. Due to a negative pressure generated by the backward rotation of the motor 242, the water of the injection water supply line 13 flows into the pump-side cap 46 through the discharge port 246. The water flowing into the pump-side cap 46 may be retransferred to the storage unit 20 through the bypass line 76 connected to the bypass port 346 and/or the suction line 72 connected to the suction port 146.

The device for supplying injection water according to the present disclosure can improve the fuel efficiency of the vehicle and realize a reduction in cost.

The present disclosure described above is not limited to the above-described embodiments and the accompanying drawings. It should be apparent to a person having ordinary skill in the art to which the present disclosure pertains that various substitutions, modifications, and alterations are possible without departing from the technical idea of the present disclosure.

What is claimed is:

1. A device for supplying injection water comprising:
    a storage unit configured to store water;
    a management unit mounted on the storage unit and configured to detect a state of the water stored in the storage unit by a sensor section and manage the water;
    a transport unit connected to the storage unit through the management unit and configured to outwardly move the water; and
    an integrated controller configured to control operations of the management unit and the storage unit,
    wherein the management unit includes
        a lid watertightly placed on the storage unit,
        a discharge port provided to the lid and configured to outwardly discharge the water in the storage unit through the lid, and
        a filter section configured to filter the water stored in the storage unit, and
    wherein the filter section and the sensor section are detachably mounted on the lid.

2. The device for supplying injection water of claim 1, wherein the management unit further includes:
    a heater section detachably mounted on the lid,
    wherein the heater section is configured to heat the water in the storage unit.

3. The device for supplying injection water of claim 1, wherein the filter section, which is inserted and mounted in the lid, includes a filter that is coupled to the discharge port, the filter being disposed in the storage unit to filter the water in the storage unit.

4. The device for supplying injection water of claim 3, wherein the filter section includes fastening protrusions that protrude radially outward from the filter section and are fitted into the lid.

5. The device for supplying injection water of claim 4, wherein the lid includes fixing members that are configured to fit the fastening protrusions by rotation.

6. The device for supplying injection water of claim 2, wherein the heater section is inserted and mounted in the lid and disposed in the storage unit, the heater section being configured to heat the water.

7. The device for supplying injection water of claim 6, wherein the heater section includes a coil heater.

8. The device for supplying injection water of claim 6, wherein the integrated controller is configured to operate the heater section at preset intervals of time.

9. The device for supplying injection water of claim 1, wherein the sensor section is inserted and mounted in the lid, the sensor section being configured to detect a level of the water in the storage unit, and the sensor section is configured to detect a temperature of the water in the storage unit.

10. The device for supplying injection water of claim 9, wherein the integrated controller is configured to receive a level of the detected water and to inform an outside when the level of the detected water is less than or equal to a certain value, and the integrated controller is configured to operate the heater section on the basis of the temperature received from the sensor section.

11. The device for supplying injection water of claim 1, wherein the transport unit includes:
    a pump-side cap having a suction port that draws the water from the discharge port and the discharge port that outwardly discharges the drawn water;
    a pump housed in the pump-side cap and configured to suction water; and
    a motor configured to provide power to the pump.

12. The device for supplying injection water of claim 11, wherein the pump-side cap further includes a bypass port configured to bypass water to the storage unit.

13. The device for supplying injection water of claim 11, wherein the pump-side cap includes a pressure sensor configured to measure a discharge pressure of water in the pump-side cap.

14. The device for supplying injection water of claim 13, wherein the integrated controller is configured to receive a discharge pressure from the pressure sensor and to control a rotational speed of the motor on the basis of the discharge pressure.

15. The device for supplying injection water of claim 11, wherein the transport unit includes a motor section that is watertightly coupled with the pump and houses the motor.

16. The device for supplying injection water of claim 15, wherein the motor section includes:
    a motor housing configured to house the motor; and
    a sealing cap configured to provide watertight coupling between the motor housing and the pump.

17. The device for supplying injection water of claim 16, wherein the motor section includes a motor controller that is mounted in the motor housing and is configured to control an operation of the motor.

18. The device for supplying injection water of claim 17, wherein the motor section includes a motor-side cap that is configured to emit heat of the motor controller and is coupled to the motor housing to be adjacent to the motor controller.

19. The device for supplying injection water of claim 18, wherein the motor-side cap includes a vent that provides communication between an inside and an outside of the motor-side cap.

20. The device for supplying injection water of claim 17, wherein the motor controller is configured to:
    rotate the motor in a first direction to direct the water in the storage unit from a suction port toward a discharge port; and
    rotate the motor in a second direction opposite to the first direction to direct the water adjacent to the discharge port toward the suction port and a bypass port.

* * * * *